United States Patent [19]

Jinbo et al.

[11] Patent Number: 5,201,016
[45] Date of Patent: Apr. 6, 1993

[54] OPTICAL SWITCH

[75] Inventors: Kunihiko Jinbo; Yoshikazu Nomura, both of Chiba, Japan

[73] Assignee: Fujikura Ltd., Tokyo, Japan

[21] Appl. No.: 752,543

[22] PCT Filed: Jan. 29, 1991

[86] PCT No.: PCT/JP91/00099
  § 371 Date: Sep. 23, 1991
  § 102(e) Date: Sep. 23, 1991

[87] PCT Pub. No.: WO91/11744
  PCT Pub. Date: Aug. 8, 1991

[30] Foreign Application Priority Data

Jan. 30, 1990 [JP] Japan .................. 2-8046[U]
Jan. 30, 1990 [JP] Japan .................. 2-8047[U]
Jan. 30, 1990 [JP] Japan .................. 2-8049[U]
Jan. 30, 1990 [JP] Japan .................. 2-8050[U]
Jan. 30, 1990 [JP] Japan .................. 2-8052[U]
Jan. 30, 1990 [JP] Japan .................. 2-19585
Jan. 30, 1990 [JP] Japan .................. 2-19586
Jul. 10, 1990 [JP] Japan .................. 2-73101[U]
Jul. 10, 1990 [JP] Japan .................. 2-181994

[51] Int. Cl.$^5$ .............................. G02B 6/00
[52] U.S. Cl. .............................. 385/19
[58] Field of Search .............................. 385/19

[56] References Cited

U.S. PATENT DOCUMENTS 4,245,886  1/1981  Kolodzey et al. .................. 385/19
4,249,794  2/1981  Haley .................. 385/19 X
4,674,831  6/1987  Bagby .................. 385/19

Primary Examiner—Akm E. Ullah
Attorney, Agent, or Firm—Jordan and Hamburg

[57] ABSTRACT

The optical switch according to the present invention momentarily switches the optical transmission lines made of tapes in which optical fibers are laid parallel to each other. This optical switch has a main body provided at the top thereof with a plug chamber in which a stationary and moving plugs in which the end portions of the optical fibers are fixed so as to abut each other are received, and a sliding mechanism provided on the moving plug. Also, the optical switch has charged in the plug chamber thereof with an oil for reducing the connecting loss, and it has an oil-leak preventive mechanism to prevent the oil from leaking from the hole in which the push pin pressing the moving plug is inserted. Further, the optical switch is provided with a lateral-pressure adjusting mechanism which appropriately gives a lateral pressure to the moving plug by means of the push pin. Furthermore, the optical switch has a cushion mechanism to accommodate a fine vibration or the like caused as the moving plug is moved.

9 Claims, 14 Drawing Sheets

OPTICAL SWITCH

FIELD OF THE INVENTION

The present invention relates to an optical switch used to switch an optical transmission line from one to another.

BACKGROUND OF THE INVENTION

Some well-known optical communications systems which transmit information through optical fibers use an optical switch of this kind.

If a trouble or fault takes place in such optical transmission line and disables the latter from transmitting further optical signals, the optical switch provided in this transmission system is used to put an auxiliary transmission line, if any, into service for further transmission of the optical signals. Such optical switches include one in which the construction is shown in FIG. 1(a). As seen, the optical switch comprises a stationary plug 101 having a connecting face A and to which one end of an optical tape core 100A consisting of a plurality of optical fibers laid parallel to one another is fixed; a moving plug 102 having a connecting face B. One end of an optical tape core 100B is connected to the plug 102, the tape core 100B also consisting a plurality of optical fibers laid parallel to one another. A connecting faces A and B abut each other. A driving mechanism 103 moves the moving plug 102 in a predetermined direction in relation to the stationary plug 101, thereby selectively connecting the optical transmission line (optical fibers in a group) in the optical tape core 100B to another optical transmission line (optical fibers in a group) in the optical tape core 100A; etc.

In the optical switching system having the above-mentioned construction, the optical switch is disposed anywhere, for example, in the middle of an optical transmission line made of an optical tape core in which plural optical fibers are laid parallel to one another. By operating the optical switch, the optical signals can be directed to any other destination or passed through any other optical transmission line. The optical switch operates on the principle described in the "Transaction of the IEEE, Vol. E73, No. 7 July 1990 pp. 1147–1149".

The construction of such optical switch will be described in further detail with reference to FIG. 1(a). As seen, the ends of optical tape cores 100A and 100B in pair are fixed to the stationary plug 101 and moving plug 102, respectively, made of a synthetic resin. Optical fibers op1, op2, . . . , op5 forming together each of the optical tape cores are equidistantly spaced from one another on one end face of each plug. Normally, the optical fibers exposed on the end face of the stationary plug 101 correspond one-to-one to those exposed on the end face of the moving plug 102 to transmit optical signals between the vis-à-vis optical fibers. For switching of the optical transmission line from one to another as in the above, the moving plug 102 is slid by the driving mechanism 103 in relation to the stationary plug 101, whereby the one-to-one correspondence between the optical fibers exposed on the end faces of the respective plugs is changed to switch the optical signal transmission route from one to another.

The mechanism of the above-mentioned optical switch will be further detailed herebelow. As forced by means of a push pin 104 disposed as a part of the driving mechanism 103, the face B' vis-à-vis to the connecting face B of the moving plug 102 slides in contact with a portion of the wall surface of a plug chamber 105a of a main body 105 in which the moving plug 102 is housed. When the moving plug 102 moves, however, a large frictional force develops between the moving plug 102 and plug chamber 105a so that the moving plug 102 cannot move smoothly.

FIG. 2 shows another example of the driving mechanism 103 in the optical switch of such structure. As seen, the driving mechanism 103 is provided with a solenoid (driving source) 106 which generates a magnetic force which will press a drive shaft 107 and the push pin 104 coupled with this shaft 107 by means of a coupling member 110, whereby the moving plug 102 which abuts the end face of the push pin 104 is moved in a predetermined direction.

For smooth sliding of the drive shaft 107 and push pin 104 within the main body 105 of the optical switch of this structure, it is necessary to insert the shaft 107 and pin 104 with their axes kept parallel to each other in the same plane. Namely, it is required that the center axes of the sliding holes in the main body 105, through which the shaft 107 and pin 104 are inserted, respectively, should be precisely parallel to each other in the same plane. In fact, however, some inaccuracy of the parallelism is unavoidable, so that the drive shaft 107 and push pin 104 slide with a wobble. In a worst case, the shaft and pin cannot slide.

In the above-mentioned optical switch, if the connecting faces of the plugs, where the latter abut each other, have any fine irregularities, the Fresnel reflection takes place to cause the efficiency of transmission to be reduced, which is an important problem.

In another example of the conventional optical switches, shown in FIG. 3, it has been proposed to charge as an matching agent an oil having a same index of refraction as the optical fiber in the plug chamber 108a in the main body 108 in which the plugs are housed, in order to prevent the Fresnel reflection from taking place even if the connecting faces have any fine irregularities. In this case, however, the oil is likely to leak from the clearance between the sliding hole wall and push pin, which is also a critical problem.

Normally in the optical switch shown in FIG. 4, each plug is placed in the plug chamber 108a of the main body 108 and the oil is charged in the plug chamber 108a, and when installing a lid in the concavity atop the main body 108 thereafter, the clearance between a lid 109 and the main body 08 is sealed with an adhesive to prevent the oil from leaking from that clearance.

In this optical switch, however, while the adhesive applied for sealing the clearance between the main body 108 and lid 109 is drying and solidifying, a portion of the adhesive flows into the plug chamber 108a of the main body 108 and mixes with the matching oil charged in the plug chamber 108a, causing the index of refraction of the oil to change.

SUMMARY OF THE INVENTION

Accordingly, the present invention has an object to overcome the above-mentioned drawbacks of the conventional techniques by providing an optical switch in which the moving plug can be instantaneously moved, the oil leak can be effectively prevented and the moving plug can be positively pushed by the push pin.

The present invention has another object to provide an optical switch in which the push pin and drive shaft can be smoothly moved even if the center axes of the sliding holes are not precisely parallel to each other in a same plane.

The present invention has still another object to provide an optical switch in which the delicate adjustment of the resilience of the spring which forces the moving plug can be easily done and the spring of which the resilience has been deteriorated may be used without replacement with a new one.

The present invention has yet another object to provide an optical switch in which the adhesive providing a seal between the main body and lid can be effectively prevented from flowing into the plug chamber.

The present invention has a further object to provide an optical switch in which the connecting loss of the optical fiber cores can be minimized.

As described in the foregoing, according to an aspect of the present invention, an optical switch is provided in which since the moving plug is given a pressure through a point contact by means of a roller forced by a push spring provided on a guide member, the pressure changes less than through a face contact and the frictional force is considerably reduced and applied evenly to the moving plug, so that a stable contact is always assured.

According to another aspect of the present invention, an optical switch is provided in which a freely contractible sealing member is provided between the push pin and the circumferential edge of the sliding hole in which the push pin slides, so that the oil charged in the main body can be positively prevented from leaking out without any interference with the movement of the push pin.

According to still another aspect of the present invention, a highly reliable optical switch is provided in which the resilience of the spring against the sealing member positively moves the moving plug, thereby permitting switching the optical transmission line from one to another speedily and accurately.

According to yet another aspect of the present invention, a highly reliable optical switch is provided in which any absence of the parallelism in a same plane between the axes of the drive shaft and push pin inserted in the main body can be accommodated effectively by a vibration attenuating means provided at the coupling between the shaft and pin so that push pin can be slid positively and smoothly.

According to still yet another aspect of the present invention, an optical switch is provided in which the pressure acting on the push pin can simply be changed and adjusted by operating a fastening means to change the positional relation between an adjusting plate and moving member.

According to a further aspect of the present invention, an optical switch is in which an undercut provided prevents the oil-sealing adhesive from flowing from a predetermined area of an concavity of the main body into the plug chamber, so that it is possible to prevent a variety of troubles from taking place due to the mixing of the adhesive into the oil in the plug chamber.

According to a still further aspect of the present invention, an optical switch is provided in which, since a lid for fixing and retaining fitting pins received in V-grooves formed in a connector block and a lid for fixing and retaining optical fiber cores are formed separately as a fitting-pin retaining lid and an optical fiber-core retaining cover, respectively, the slanting or torsion due to any dimensional error, which would take place with the conventional single common retaining lid, will not occur with these lids, so that even in case the lids are made by molding, of a ceramic or synthetic resin that is relatively difficult to mold with a high dimensional accuracy, no axial or angular misalignment between the optical fiber cores will result, whereby the optical fiber cores can be connected to each other with a high accuracy and small connecting loss.

According to a yet further aspect of the present invention, an optical switch is provided in which since a small wobble caused by the clearance between the walls of the V-grooves provided in the moving for movably receiving the fitting pins can be completely eliminated, the axial or angular misalignment between the optical fiber cores to be connected to each other can be eliminated and also the vibration caused during the switching movement can be prevented, whereby the connecting loss during the connection in progress between the optical fiber cores can be minimized.

DISCLOSURE OF THE PREFERRED EMBODIMENTS

The present invention will be further described herebelow with reference to the drawings.

Figure 1A:
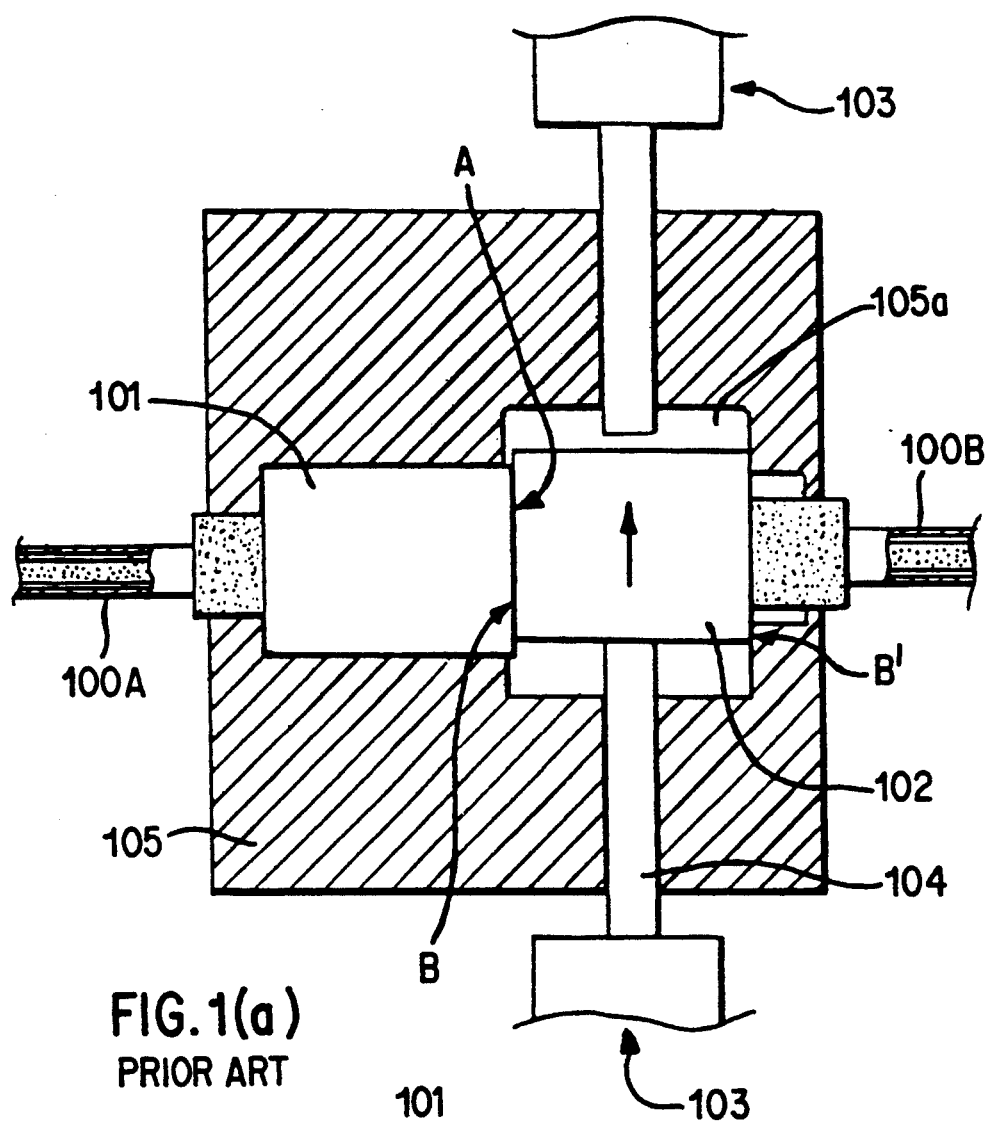
FIG. 1(a) is a cross-sectional view of the conventional optical switch.
Figure 1B:
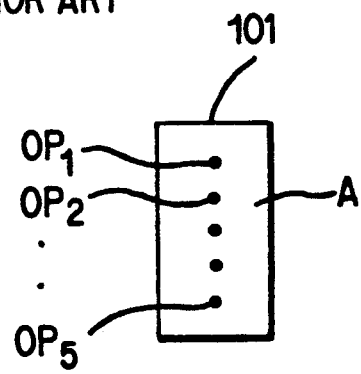
FIG. 1(b) is a plan view of the end connecting face of the stationary plug shown in FIG. 1(a)
Figure 2:
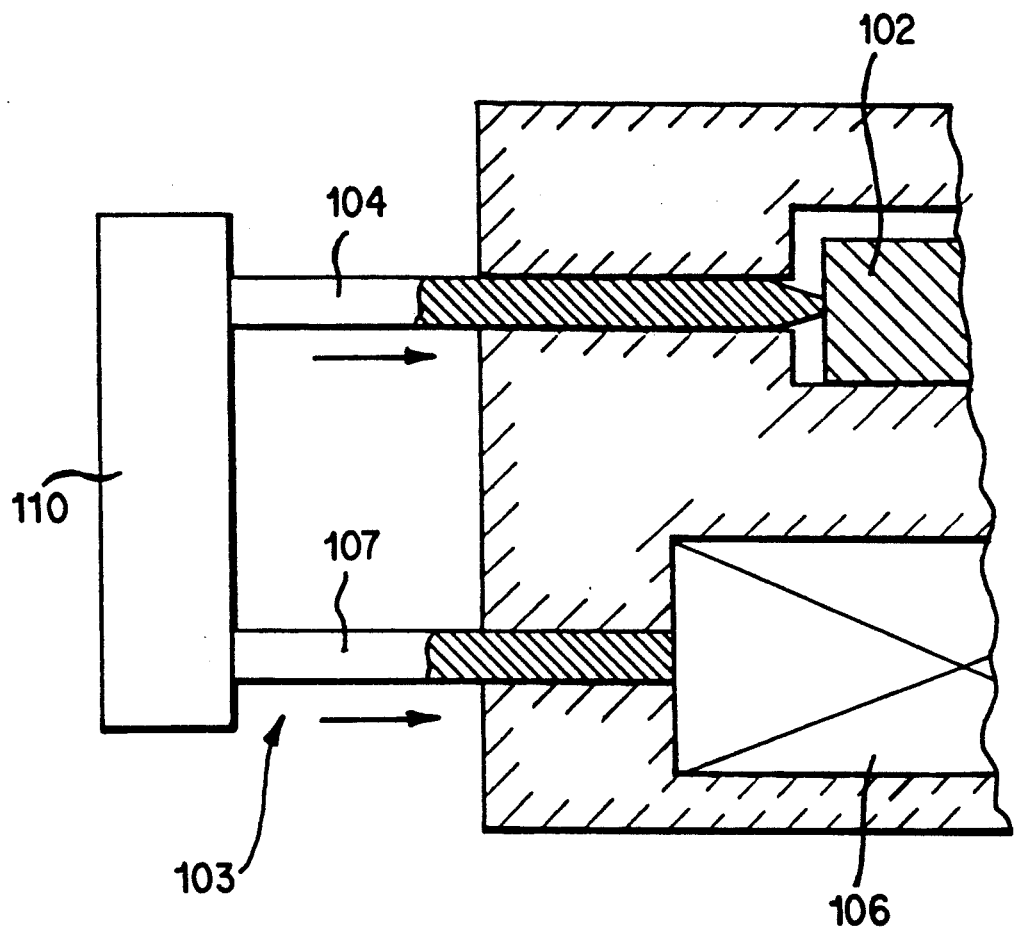
FIG. 2 is an axial-sectional view of the optical switch shown in FIG. 1(a)
Figure 3:
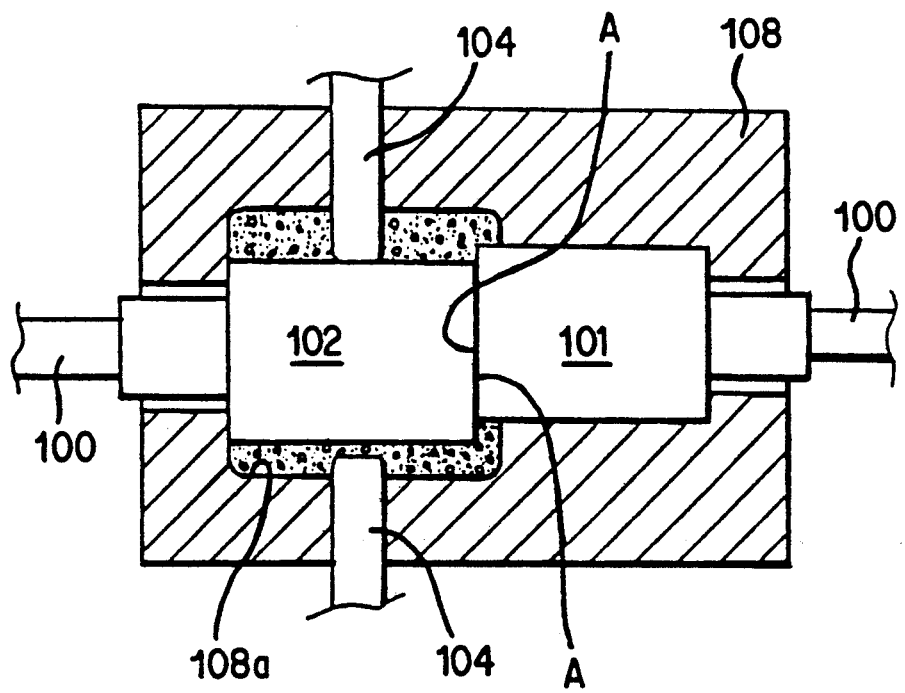
FIG. 3 is a cross-sectional view of a variant of the conventional optical switch.
Figure 4:
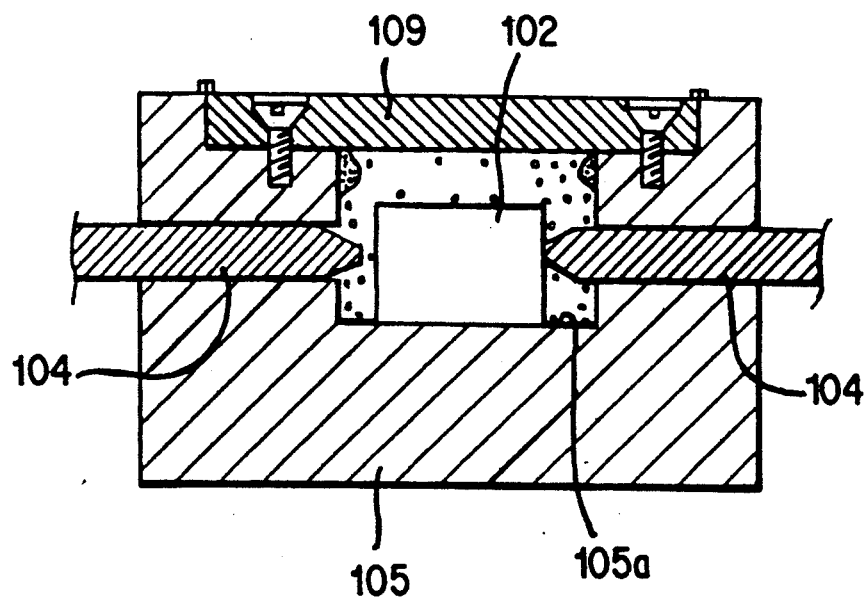
FIG. 4 is an axial-sectional view of the optical switch shown in FIG. 3.
Figure 5:
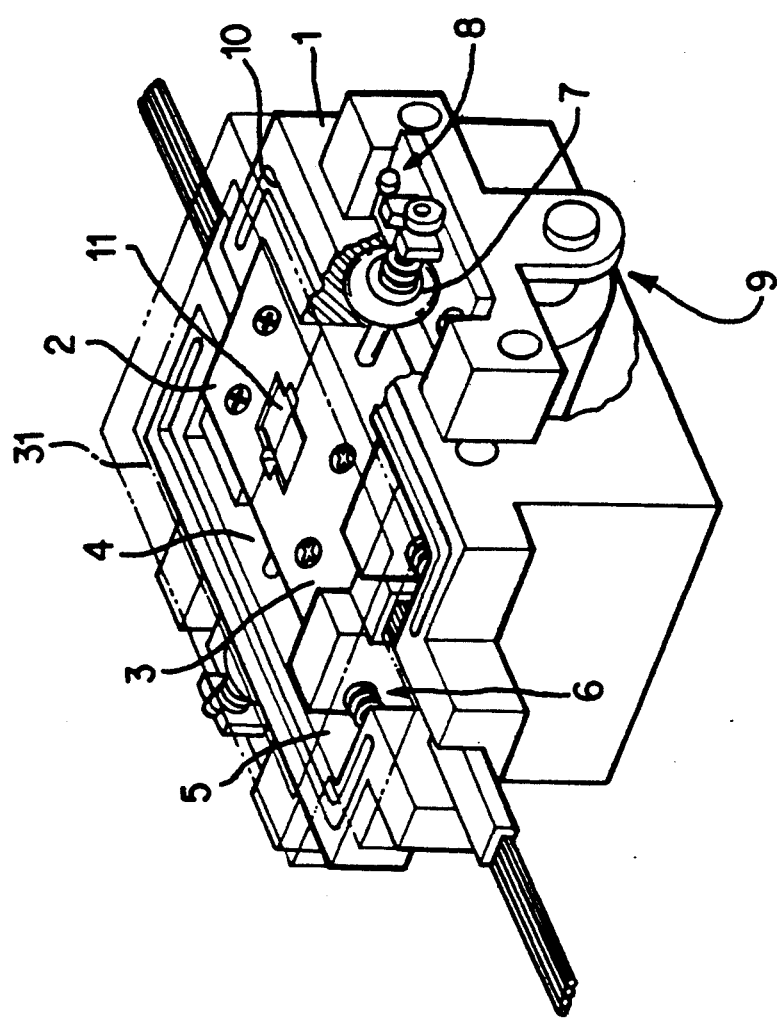
FIG. 5 is a perspective view of a first embodiment of the optical switch according to the present invention.

FIG. 5 shows the first embodiment of the optical switch according to the present invention. This optical switch comprises a main body 1 having a plug chamber 4 in which a stationary plug 2 and moving plug 3 are housed and also an oil 5 having a same index of refraction as the optical fiber (for example, silicon oil or the like excellent in deforming property and low in viscosity) is charged and sealed, a sliding mechanism 6, oil-leak mechanism 7, lateral-pressure adjusting mechanism 8, cushion mechanism 9, undercut 10 and a fiber fixing mechanism 11.

Figure 6:
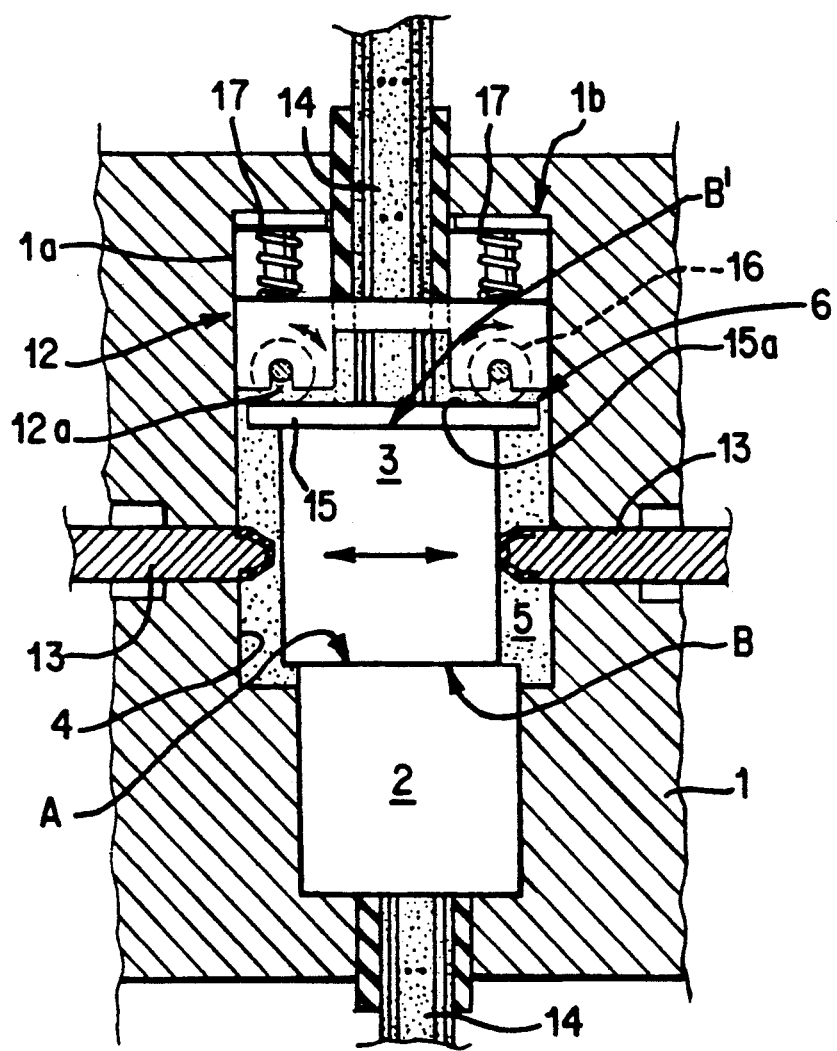
FIG. 6 is a cross-sectional view of the sliding mechanism in the optical switch shown in FIG. 5.

FIG. 6 shows the sliding mechanism 6 of the optical switch according to the first embodiment. This sliding mechanism 6 is provided to keep a guide member 12 in contact with the contact plate 15 which, as will be explained later, is attached to the base end B of the moving plug 3 in the main body 1.

In FIG. 6, the reference numeral 13 indicates a push pin and 14 indicates an optical tape core.

The stationary plug 2 supports, as rigidly secured, one end of an optical fiber group of which the optical fiber ends are arranged as generally equidistantly spaced from each other and straightly projected from the stationary plug 2.

The moving plug 3 has a contact plate 15 attached to the base end B' thereof opposite to the side where connecting face B is provided. A roller 16 of the guide member 12 is in contact with a contact surface 15a of the contact plate 15 as will be explained later. The contact face 15a of the contact plate 15 is mirror-finished for minimum irregularities thereon. It should be noted that the moving plug 3 supports, as rigidly secured, one end of another optical fiber group in which the optical fiber ends are arranged as generally equidistantly spaced from each other and straightly projected from the moving plug 3.

The guide member 12 is set slidable in the direction of the moving plug 3 inside the plug chamber 4 in the main body 1. The guide member 12 has formed in the end thereof opposite to the moving plug 3 a pair of cuts 12a, right and left, in each of which there is rotatably fitted a roller 16 which is in contact with the contact face 15a of the contact plate 15.

Also, the guide member 12 has provided between the base end thereof and a pair of spring guides 1b each having a guide projection 1a a pair of compression springs 17 which always force the rollers 16 to the contact face 15a.

Figure 7:
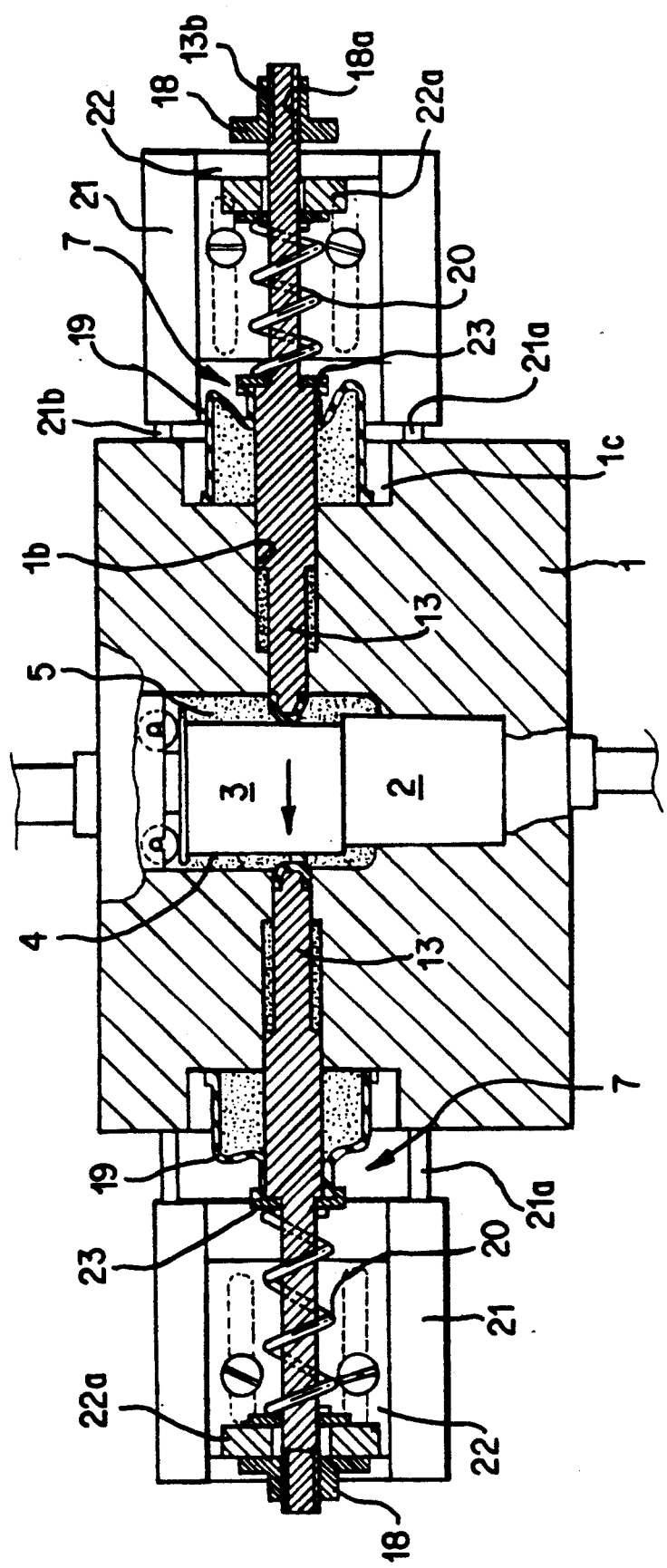
FIG. 7 is a cross-sectional view of the oil leak-preventive mechanism in the optical switch in FIG. 5.
Figure 8:
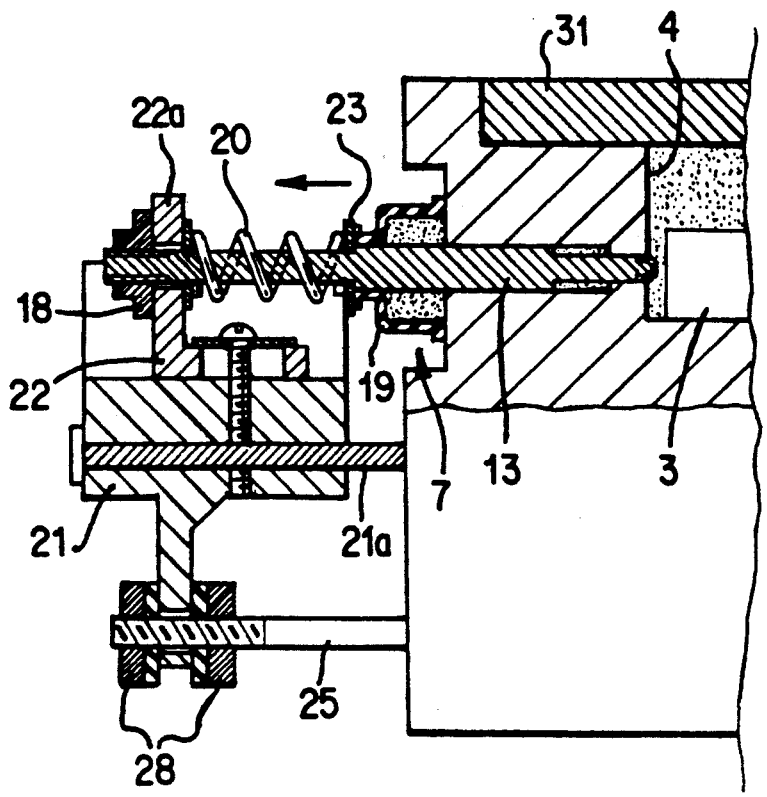
FIG. 8 is a fragmentary axial-sectional view of the optical switch shown in FIG. 7.

FIGS. 7 and 8 show the oil-leak preventive mechanism 7 of the optical switch according to the above-mentioned first embodiment. The oil-leak preventive mechanism 7 has a stopper 18 screwed on the base end of the push pin 13 and also a sealing member 19 attached between the push pin 13 and the main body 1.

In FIGS. 7 and 8, the reference numeral 20 indicates a spring which gives a predetermined force to the push pin 13, 21 indicates a moving block which is moved forward by means of solenoids (not shown) coupled to each other by guide shafts 21a and 21b, and 22 indicates an adjusting plate vertically extended by a pusher 22a pressing the spring 20 and which is installed on the moving block 21. The adjusting plate 22 will be explained in further detail later.

The main body 1 has a recess 1c formed in the circumference of the outer opening of the sliding hole 1b and in which the sealing member 19 is installed. This arrangement permits the secure installation of the sealing member 19 to the main body 1.

Figure 9:
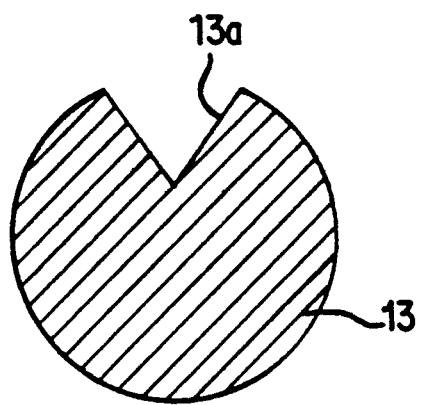
FIG. 9 is a sectional view showing the shape of the push pin in the optical switch shown in FIG. 5.

The push pin 13 has a step formed at the intermediate portion thereof which has a larger diameter. This large-diameter intermediate portion is slidably fitted into the sliding hole 1b open at the side of the main body 1. To permit the oil 5 between the plug chamber 4 and sealing member 19 to freely flow, there is formed a recess 13a in the push pin 13 from the end to the large-diameter intermediate portion thereof as shown in FIG. 9. Note that the push pin 13 is moved forward with the driving force of the solenoids (not shown) and under the action of the spring 30 and the moving plug 3 is pushed under the action of the spring 20, thereby switching the optical transmission line from one to another.

The stopper 18 is interlocked with the push pin 13 by means of the moving block 21 to retract the push pin 13 so that the moving plug 3 is pressed only by the push pins 13 opposite to each other.

The sealing member 19 is provided to prevent the oil 5 from leaking from the sliding hole 1b to outside the main body 1 due to a change in pressure inside the sliding hole 1b and plug chamber 4, which occurs as the push pin 13 is slid. The sealing member 19 in this embodiment has a buckled form and is made of a flexible material such as rubber or the like. Namely, the sealing member 19 is freely contractible. When the sealing member 19 in this embodiment takes a shape shown at the right of FIG. 7 (namely, when bent), no spring force acts on it and thus it is static and stable. As the push pin 1 moves further to the left, the sealing member 19 is dynamically compressed. When the sealing body 19 takes the form shown at the left of FIG. 7 (namely, when extended), a spring force acts on the push pin 13 so as to return it to the right. The sealing member 19 is secured to a seal ring 23 engaging the large-diameter portion of the moving plug 13 and also to the outer circumference of the large-diameter portion near the seal ring 23.

Figure 10:
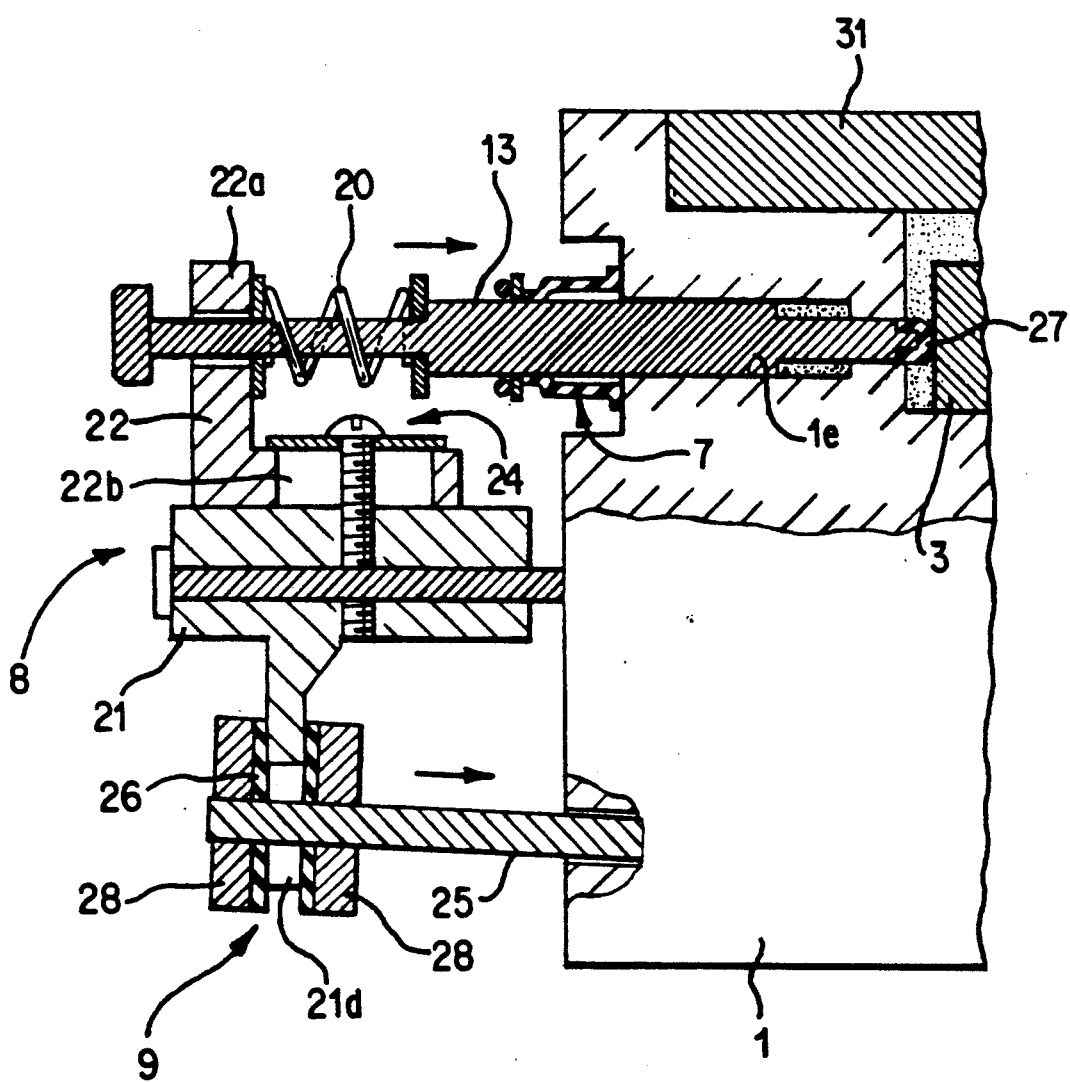
FIG. 10 is a fragmentary axial-sectional view showing the essential parts of the cushion mechanism and lateral-pressure adjusting mechanism in the optical switch shown in FIG. 5.

FIG. 10 shows a lateral-pressure adjusting mechanism 8 of the optical switch according to this embodiment. The lateral-pressure adjusting mechanism 8 comprises the moving block 21, the adjusting plate 22 and a fastening means 24.

The reference numeral 25 indicates a drive shaft pushed by an appropriate mechanism including a solenoid (not shown) as a driving means.

The moving block 21 is so arranged as to adjust the resilience of the spring 20 which forces the push pin 13. In this embodiment, the moving block 21 has the adjusting plate 22 screwed on the top thereof. Further, the adjusting plate 22 has formed at the opposite ends thereof as directed parallel to the sliding direction of the push pin 13 a pair of elongated holes 22b having a predetermined length and a sufficient width for insertion of a binding screw 24a for a fastening means 24.

Figure 11:
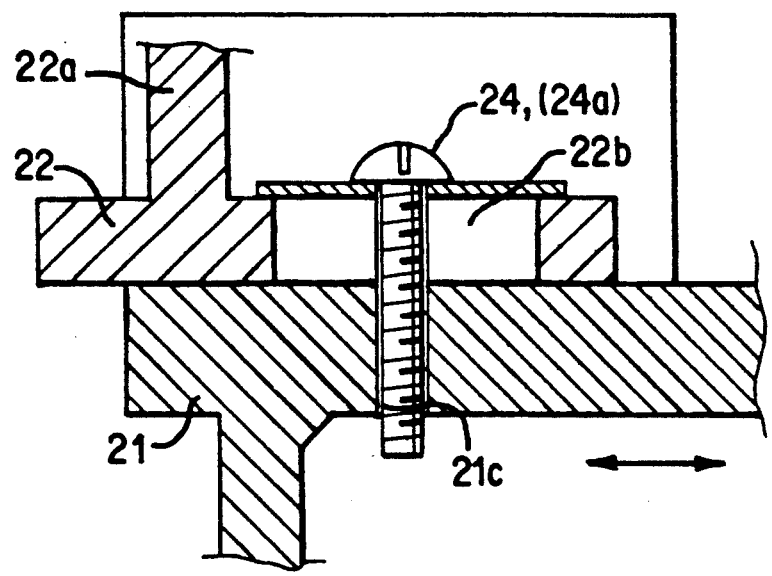
FIG. 11 is a sectional view, enlarged in scale, of the essential parts shown in FIG. 10.

The fastening means 24 is provided to change the positional relation between the adjusting plate 22 and moving block 21, and it consists, in this embodiment, of the binding screw 24a shown in FIG. 11. Both the adjusting plate 22 and moving block 21 are fixed to the fastening means 24 and binding screw 24a is tightened after the adjusting plate 22 is appropriately positioned.

The fastening means 24 is shown in further detail in FIG. 11.

The moving block 21 has formed beneath the elongated hole 22b in the adjusting plate 22 a screw hole 21c in which the binding screw 24a for the fastening means 24 is screwed.

As seen from FIG. 10, the cushion mechanism 9 of the optical switch according to the present invention includes a vibration attenuating means 26 provided at a drive shaft 25, and another vibration attenuating means 27 provided at the end of the push pin 13.

The drive shaft 25 has a pair of fixing members 28 screwed at the end thereof. The pair of fixing members 28 is used to receive and fix a coupling 21d of the moving block 21.

The vibration attenuating means 27 accommodates the fine vibration caused just after the push pin 13 is pressed to the lateral side of the moving plug 3. In this embodiment, the vibration attenuating means 27 is a rubber cushion secured to the end of the push pin 13. The vibration attenuating means 27 may be otherwise secured to the end of the push pin 13. For example, a rubber as the attenuating means may be secured, by baking, to the end of the push pin 13.

Figure 12:
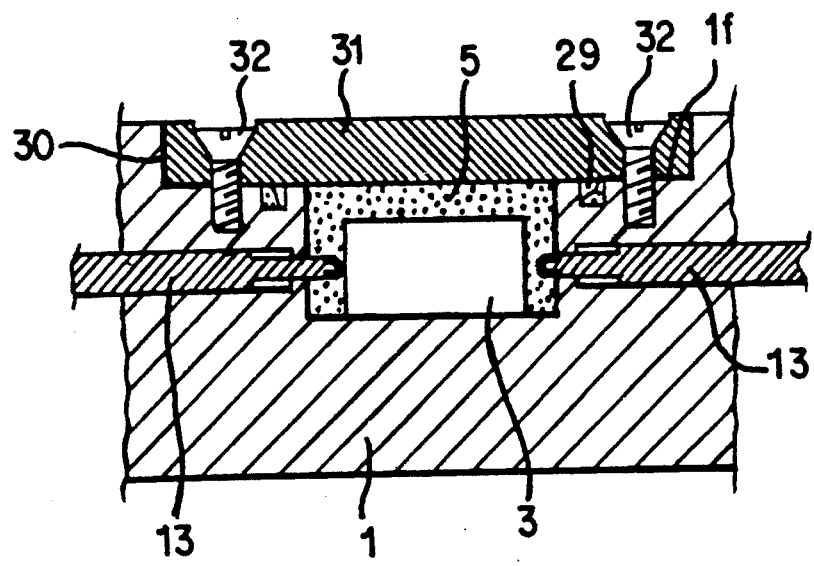
FIG. 12 is an axial-sectional view of the essential parts including the undercut and so forth in the optical switch shown in FIG. 5.

FIG. 12 shows the main body 1 of the optical switch according to this embodiment. The main body 1 has an undercut 29 formed in the concavity 1f thereof in which a lid 31 is secured with an adhesive 30.

Figure 13:
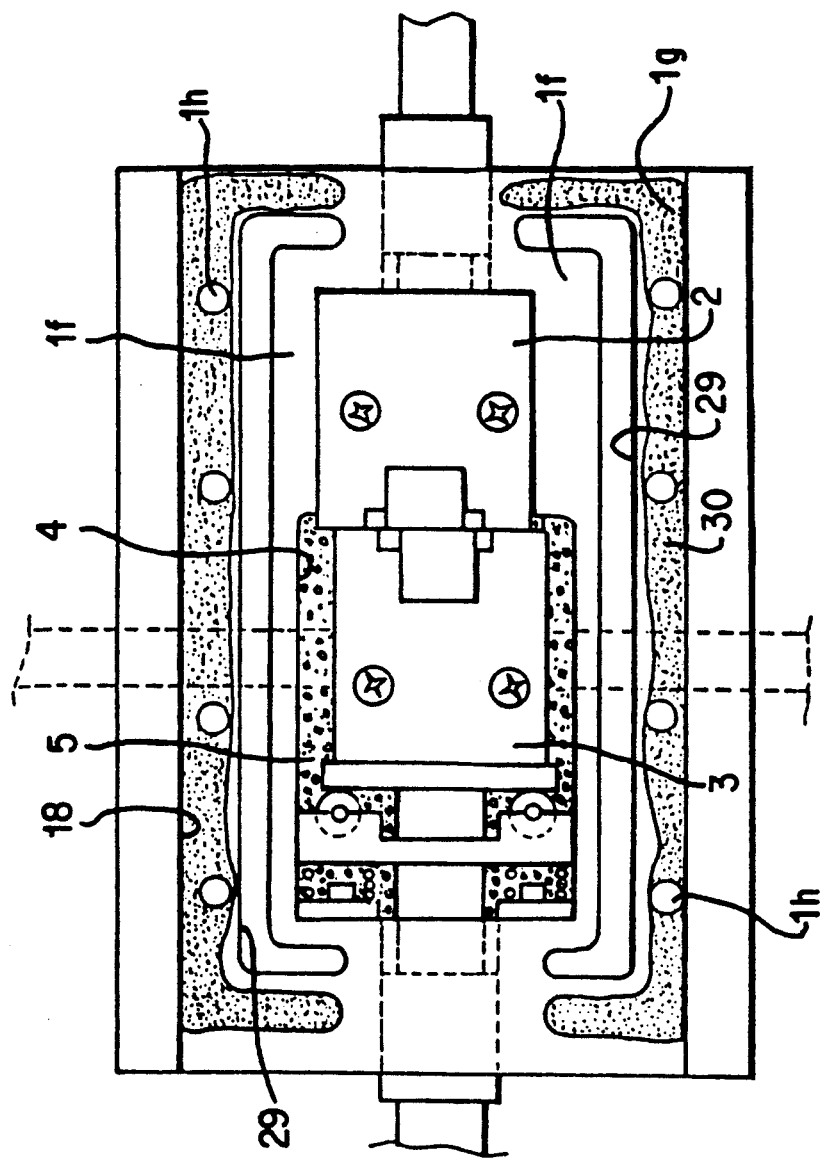
FIG. 13 is a plan view showing the shape of the undercut formed in the main body shown in FIG. 12.

As shown in FIG. 13, the main body 1 has formed in the middle of the recess 1f thereof the previously-mentioned plug chamber 4 in which the moving plug 3 and stationary plug 4 are housed. To prevent the adhesive 30 from flowing into the plug chamber 4, the undercut 29 is so formed as to surround the circumference of the plug chamber 4. Note that the plug chamber 4 has charged therein the previously-mentioned oil 5 having a same predetermined index of refraction (for example, 1.47) as the optical fiber to prevent the Fresnel reflection at the connecting end face of the optical fibers (not shown), namely, the phenomenon of optical reflection taking place at the interface between two kinds of media different in index of refraction.

The adhesive 30 also acts as a sealant to prevent the oil 5 from leaking from inside the plug chamber 5.

Figure 14:
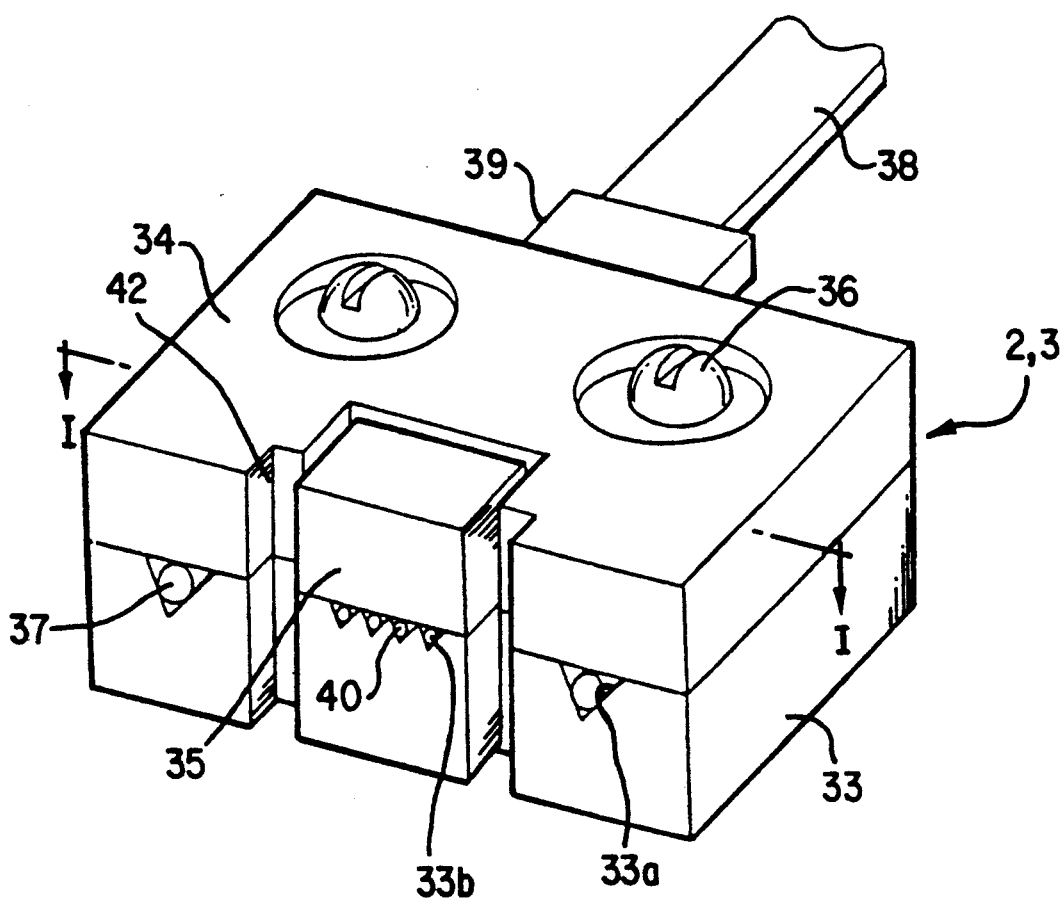
FIG. 14 is a schematic perspective view showing the structure of each plug in the optical switch shown in FIG. 5.

FIG. 14 shows the optical fiber fixing mechanism 11 of the optical switch according to the present invention, the mechanism 11 comprising a connector block 33, a fitting-pin retaining lid 34 and an optical fiber core retaining lid 35.

The connector block 33 has a generally rectangular shape and is made of an appropriate material such as ceramic or synthetic resin. The connector block 33 has formed therein on the top thereof and near the end thereof a pair of parallel V-grooves for the fitting pins. Further, the connector block 33 has formed therein at the intermediate top portion thereof between the two V-grooves 33a in pair for the fitting pins a plurality of, for example, 4 or 8 parallel V-grooves 33b for receiving the optical fiber cores.

The fitting pin retaining lid 34 is secured to the top of the connector block 33 with a pair of machine screws 36. The fitting-pin retaining lid 34 has nearly the same outside shape as the connector block 33, but its intermediate portion which otherwise would face the optical fiber-core receiving V-grooves 33b is missing. The portions of the bottom resting on the connector block 33, which are in contact with the fitting-pin receiving V-grooves 33, must have finished to be a smooth flat surface.

The fitting pins 37 are received in the V-grooves 33a and retained by the lid 34.

Figure 15:
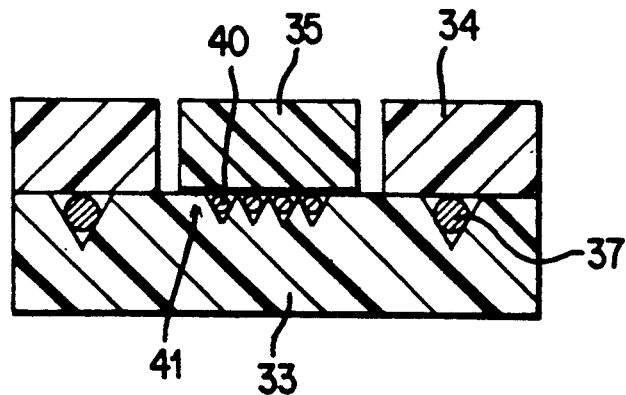
FIG. 15 is a sectional view, taken along the line I—I, of the plug shown in FIG. 14.

There are received separately in the optical fiber core receiving V-grooves 33b the plurality of optical fiber-cores 40 being the end of the optical fiber tape 38 (the reference numeral 39 indicates the rubber boot) introduced from the other side of the connector block 33. Completely separate from the fitting-pin retaining lid 34, the optical fiber-core retaining lid 35 shaped like a block is attached to the connector block 33 with an appropriate adhesive 41 (see FIG. 15) to retain and fix the optical fiber cores 40. The optical fiber-core retaining lid 35 is installed at the aforementioned missing intermediate portion of the connector block 33.

The reference numeral 42 indicates an undercut for flow-out of the matching agent applied to the end face of the optical fiber core 1.

Figure 16:
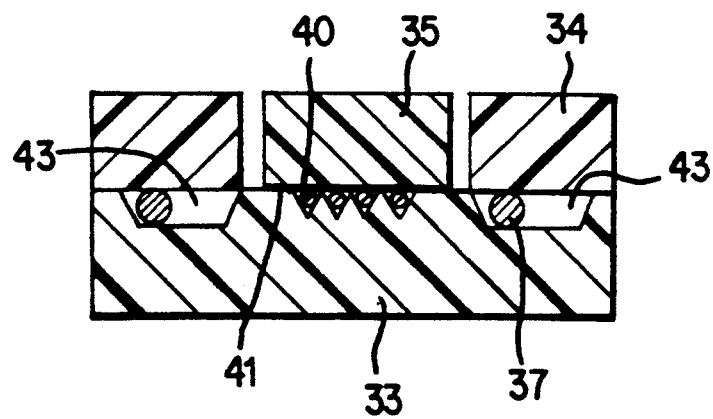
FIG. 16 is an axial-sectional view of the moving plug vis-à-vis to the stationary plug according to the present invention.

The fixing mechanism according to the present invention may be constructed as shown in FIG. 16. As seen, this structure is different from that in the aforementioned embodiment in that the fitting-pin receiving elongated V-grooves 43 have a larger width than the outside diameter of the fitting pins 37 in the parallel laid direction of the plurality of optical fiber cores 40. This fixing mechanism can be used in the optical switch.

Therefore, in the first embodiment of the present invention, the sliding mechanism 6 acts to permit a switching between the optical fibers supported in the stationary and moving plugs 2 and 3 in abutment to each other by the solenoid as a driving means in an extremely short time or in about 0.2 msec after the application of the voltage to the solenoid is started, that is, nearly instantly.

Also in this first embodiment, when the resilience of the spring 20 has deteriorated due to the change with time, the pressure on the push pin 13 can be adjusted by moving the moving block 21 over an appropriate distance with respect to the adjusting plate 22 and then fixing both the moving block 21 and the adjusting plate 22 by tightening with the binding screw 24a and nut 24b to recover the spring resilience.

Further in the first embodiment, the drive shaft 25 and push pin 13 can be coupled to each other, with their axes kept deflected an angle $\theta$ from each other, by means of the vibration attenuating means 27 which made of a very flexible spacer.

Furthermore in the first embodiment, the change of the distance between the push pin 13 and drive shaft 25, which will take place due to any absence of the parallelism in the same plane between the axes as they are moved forward into their sliding holes, can be effectively eliminated owing to the loose insertion hole of the vibration attenuating means 27.

Next, the second embodiment of the optical switch according to the present invention will be explained with reference to FIGS. 17 to 19.

The optical switch according to the second embodiment has stationary and moving plugs 44 and 45 composed of a base block 46 and upper lid 47, respectively, and is so arranged that the moving plug 45 is forced upward by a lifting spring 49 by means of a lining plate 48.

Figure 17:
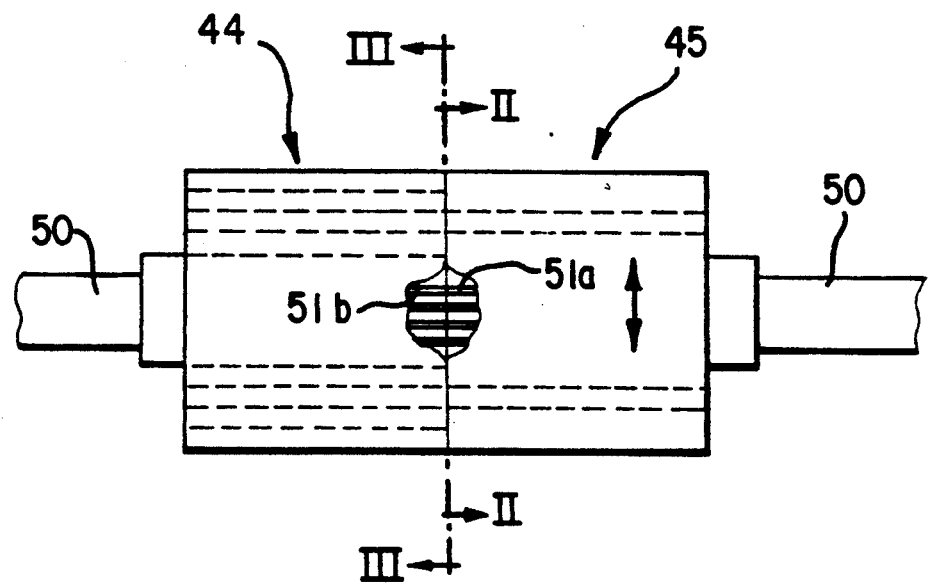
FIG. 17 is a schematic plan view showing the construction of each plug in a variant or second embodiment of the optical switch according to the present invention.

FIG. 17 shows the connection of the optical fiber tapes 50 to each other. As seen, the plugs 44 and 45 are installed at the respective ends of the optical fiber tapes 50, and the optical fiber cores 51a and 51b included in the respective optical fiber tapes 50 are fixed as positioned in the plugs 44 and 45, respectively, so as to have their respective ends in vis-à-vis contact with each other.

The moving plug 45 is movable in the parallel laid direction of the optical fiber cores for switching between the optical fibers in the moving plug 45 and those in the stationary plug 44.

Figure 18:
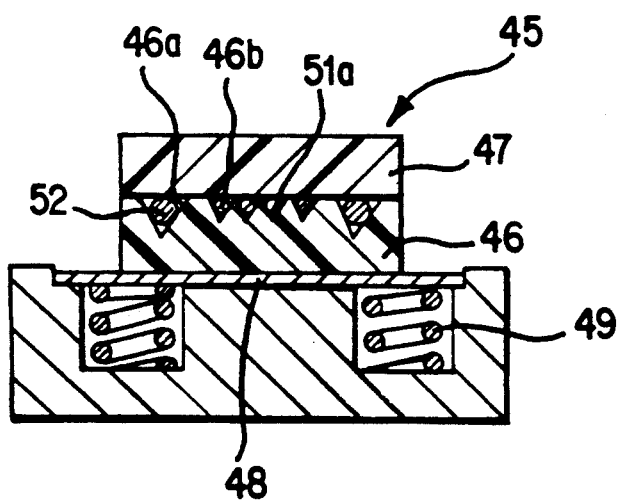
FIG. 18 is a sectional view, taken along the line II—II, of the variant of the optical switch shown in FIG. 17.

Referring now to FIG. 18, the moving plug 45 is illustrated which has a base block 46 made, by molding, of a ceramic or an appropriate synthetic resin. The base block 46 has formed in the top thereof a pair of V-grooves 46a in which fitting pins 52 are received and fixed and also has V-grooves 46b formed therein between the V-grooves 46a, in which the plurality of optical fiber cores 51a are received as positioned.

The upper lid 47 is attached to the top of the base block 46 to fix and retain the fitting pins 52 and optical fiber cores 51b.

There is provided under the base block 46 of the moving plug 45 the lining plate 48 which provides a sliding guide of the moving plug 45, and a lifting spring 49 is provided under the lining plate 48 to always forces the moving plug 45 upward by means of the lining plate 48.

Figure 19:
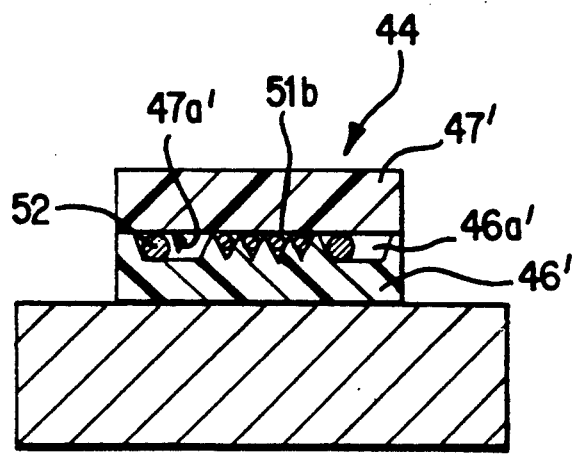
FIG. 19 is a sectional view, taken along the line III—III, of the variant of the optical switch shown in FIG. 17.

FIG. 19 shows the stationary plug 44. The base block 46' of the stationary plug 44 has formed in the top center thereof a plurality of V-grooves for positioning and receiving the optical fiber cores 51b, and there are formed across these V-grooves elongated V-grooves 46a' in positions corresponding to those of the fitting pins 52 of the moving plug 45. The elongated V-grooves 46a' have a sufficient width for switching movement of the fitting pins 52 in the parallel direction of optical fiber cores 51b.

An upper lid 47, is attached to the top of the base block 46' to fix the optical fiber cores 51b. The fitting pins 52 in the elongated V-grooves 46a' are pressed under the bottom face 47a' of the upper lid 47', thereby preventing the fitting pins 52 from coming out upward.

As seen in FIG. 17, when the moving plug 45 is moved for switching with respect to the stationary plug 44, the fitting pins 52 secured to the moving plug 45 are forced upward because the moving plug 45 is always forced upward by the lifting spring 49. Thus, the fitting pins 52 are guided by the bottom face 47a' of the upper lid 47' of the stationary plug 44 in a sliding contact with the latter.

Conventionally, for eliminating the backlash of, for example, a gear wheel, a force is always applied to the gear wheel in one rotating direction thereof. A similar manner is taken here to remove the wobbling due to the clearance between the outside diameter of the fitting pins 52 and the inside dimension of the elongated V-grooves 46a' so that the fitting pins 52 is correctly guided by the bottom face 47a' of the upper lid 47' of the stationary plug 44 while in contact with the bottom face 47a'.

As described above, the optical switches according to the present invention are effectively usable as a rapid switching means for optical transmission lines, permit a positive switching and have only a small connecting loss of transmission. The optical switches according to the present invention can preferably be usable in a long-distance optical communications system.

What is claimed is:

1. In an optical switch in an optical transmission line made of a plurality of optical fibers and having at least two optical fiber groups, the switch having a stationary plug so secured to the end portion of one of the two optical fiber groups that the ends of the optical fibers in the first group are exposed in a face of said stationary plug, and a moving plug so secured to the end portion of the other optical fiber group that the ends of the optical fibers in the second group are exposed in a face of said moving plug, the stationary and moving plugs being in contact with each other at said faces, comprising:
a driving means for sliding said moving plug momentarily for at least one pitch space of the optical fibers normal to the line of said optical fibers while being kept in contact with said stationary plug;
a main body having a plug chamber housing said stationary and moving plugs and in which a matching oil is charged;
a sliding mechanism for smoothing the switching movement of said moving plug inside said plug chamber of said main body;
a push pin extending through said main body to contact and move said moving plug;
an oil-leak preventing mechanism for preventing said matching oil from leaking from between said push pin and main body;
a lateral-pressure adjusting mechanism including a spring and being mounted to apply a lateral pressure to said push pin;
and a cushion mechanism for attenuating fine vibration of said moving plug caused by pressure thereagainst from said push pin.

2. An optical switch as set forth in claim 1, wherein said sliding mechanism has a guide member with a roller that contacts the side opposite to the connecting face of said moving plug which abuts said connecting face and rolls following the movement of said moving plug.

3. An optical switch as set forth in claim 1, wherein said oil-leak preventive mechanism has a flexible sealing member with a buckled shape between said push pin and main body.

4. In an optical switch in an optical transmission line made of a plurality of optical fibers and having at least two optical fiber groups, the switch having a stationary plug so secured to the end portion of one of the two optical fiber groups that the ends of the optical fibers in the first group are exposed, and a moving plug so secured to the end portion of the other optical fiber group that the ends of the optical fibers in the second group are exposed, the stationary and moving plugs being in contact with each other, comprising:
a driving means for sliding said moving plug momentarily for at least one pitch space of the optical fibers normal to the line of said optical fibers while being kept in contact with said stationary plug;
a main body having a plug chamber housing said stationary and moving plugs and in which a matching oil is charged;
a sliding mechanism for smoothing the switching movement of said moving plug inside said plug chamber of said main body;
a push pin extending through said main body to contact and move said moving plug;
an oil-leak preventing mechanism for preventing said matching oil from leaking from between said push pin and main body;
a lateral-pressure adjusting mechanism including a spring and being mounted to apply a lateral pressure to said push pin;

and a cushion mechanism for attenuating fine vibration of said moving plug caused by pressure thereagainst from said push pin, said laterial-pressure adjusting mechanism comprising:
- an adjusting plate in which the base end of said push pin is slidably inserted;
- a moving block coupled with a drive shaft for transmitting a driving force to said adjusting plate; and
- a means for fastening said adjusting plate and moving block in a positional relation to adjust the spring force applied to said push pin.

5. In an optical switch in an optical transmission line made of a plurality of optical fibers and having at least two optical fiber groups, the switch having a stationary plug so secured to the end portion of one of the two optical fiber groups that the ends of the optical fibers in the first group are exposed, and a moving plug so secured to the end portion of the other optical fiber group that the ends of the optical fibers in the second group are exposed, the stationary and moving plugs being in contact with each other, comprising:
- a driving means for sliding said moving plug momentarily for at least one pitch space of the optical fibers normal to the line of said optical fibers while being kept in contact with said stationary plug;
- a main body having a plug chamber housing said stationary and moving plugs and in which a matching oil is charged;
- a sliding mechanism for smoothing the switching movement of said moving plug inside said plug chamber of said main body;
- a push pin extending through said main body to contact and move said moving plug;
- an oil-leak preventing mechanism for preventing said matching oil from leaking from between said push pin and main body;
- a lateral-pressure adjusting mechanism including a spring and being mounted to apply a lateral pressure to said push pin;
- and cushion mechanism for attenuating fine vibration of said moving plug caused by pressure thereagainst from said push pin, said cushion mechanism comprising a vibration attenuating means at the connection between the end of said drive shaft and the base end of said push pin to accommodate any absence of parallelism in the same plane between the axes of said drive shaft and push pin, and a vibration attenuating means at the end of said push pin.

6. An optical switch having a main body with a plug chamber in which a stationary plug is fixed and a moving plug is housed movably within a predetermined range, and a lid attached as sealed with an adhesive in a recess formed in the top of said main body, comprising:
- an undercut formed so as to surround said plug changer of said main body and which prevents said adhesive from flowing into a predetermined area in said recess of said main body.

7. An optical switch, comprising:
- a connector block having a pair of fitting-pin receiving V-grooves and a plurality of optical fiber-core receiving V-grooves formed in the top thereof;
- a fitting-pin retaining lid mounted on said connector block and which has a smooth bottom face which retains the fitting pins received in said fitting-pin receiving V-grooves; and
- an optical fiber-core retaining lid separately provided to retain the plurality of optical fiber cores received in said optical fiber-core receiving V-grooves.

8. An optical switch as set forth in claim 7, wherein said fitting-pin receiving V-grooves are elongated V-grooves having a larger width than the outside diameter of said fitting pins in the parallel direction of the plurality of optical fiber-core receiving V-grooves.

9. An optical switch, comprising:
- a moving plug secured to the end of one of the optical fiber rapes to be connected and consisting of a main body and an upper lid engaging said main body, and in which the optical fiber cores included in the optical fiber tape are fixed as positioned and a pair of fitting pins are fixed in the V-grooves;
- a stationary plug secured to the end of the other optical fiber tape to be connected and consisting of a main body and an upper lid engaging the top of said main body, and having formed therein elongated V-grooves in which the optical fiber cores included in the optical fiber tape are fixedly positioned and said fitting pins are slidably engaged; and
- a lining plate which slidably guides said moving plug and gives an upward pressure, by means of a lifting spring, to said moving plug in the direction of the upper lid perpendicular to the plane in which said optical fiber cores are parallel, thereby moving the optical fiber cores for switching while forcing the moving plug upward.

* * * * *